UNITED STATES PATENT OFFICE.

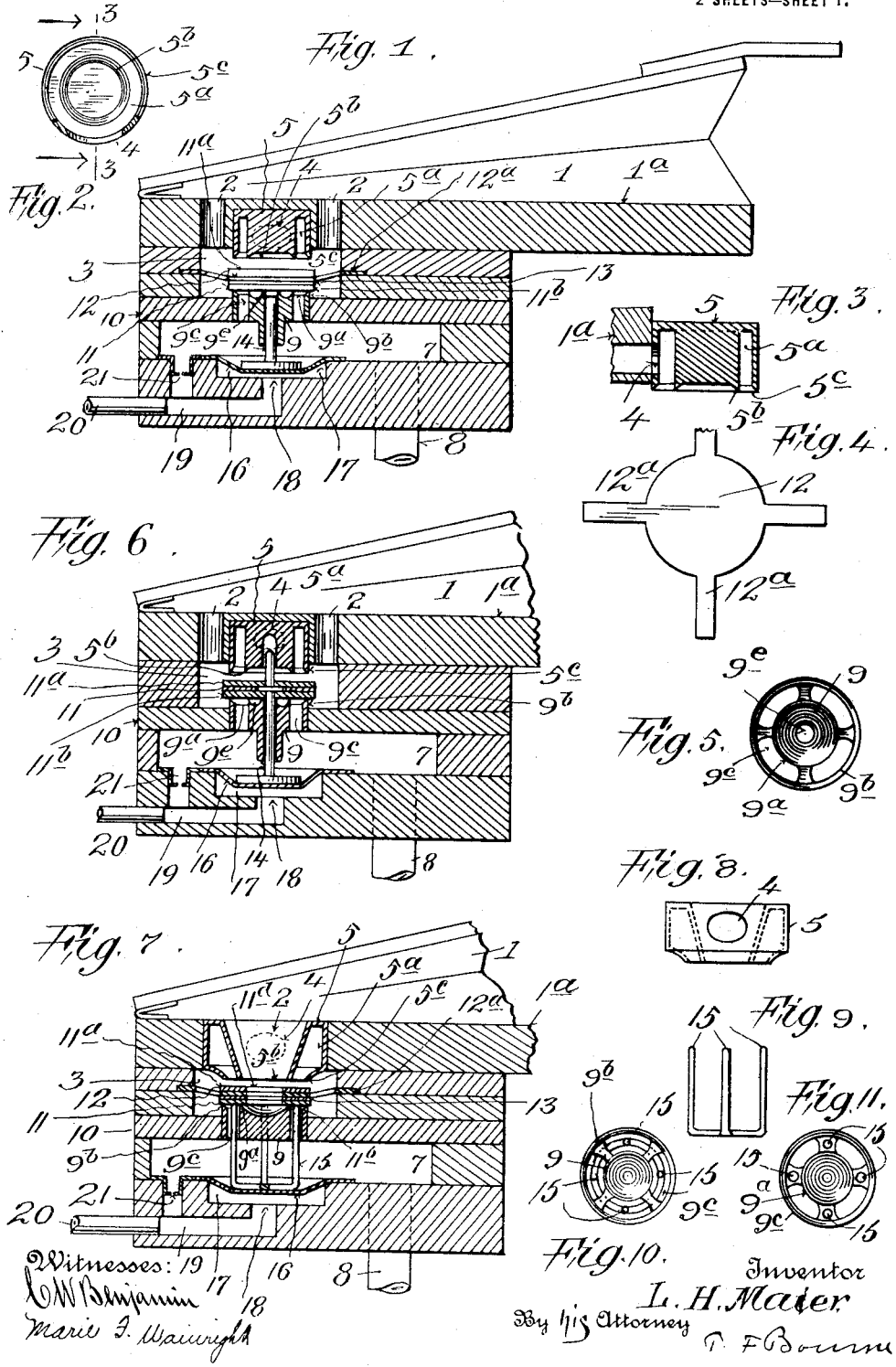

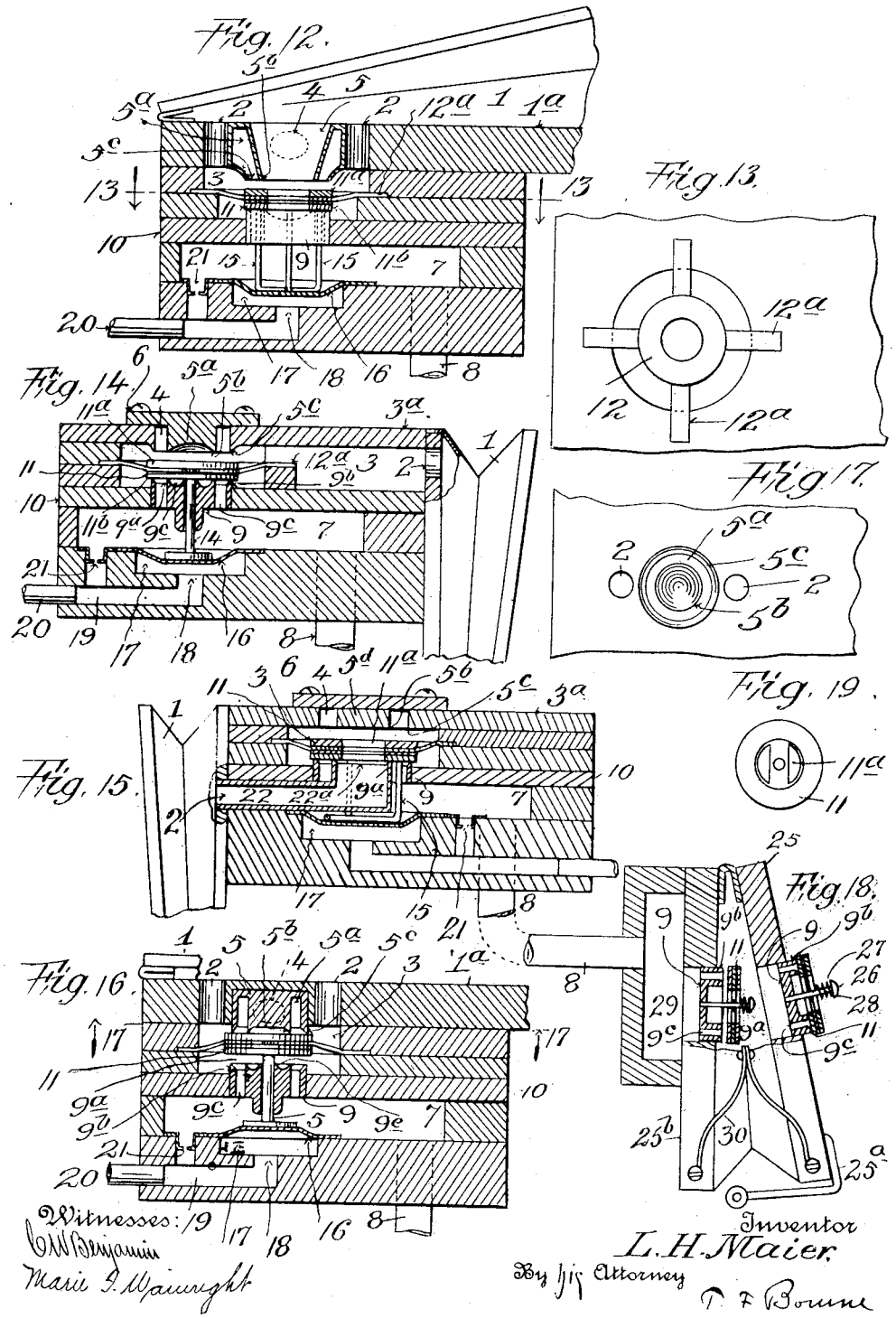

LOUIS H. MAIER, OF NEW YORK, N. Y.

VALVE MECHANISM FOR MUSICAL INSTRUMENTS AND THE LIKE.

1,207,779. Specification of Letters Patent. Patented Dec. 12, 1916.

Application filed May 2, 1913. Serial No. 765,003.

*To all whom it may concern:*

Be it known that I, LOUIS H. MAIER, a citizen of the United States, and resident of New York city, borough of the Bronx, in the county of New York and State of New York, have invented certain new and useful Improvements in Valve Mechanisms for Musical Instruments and the like, of which the following is a specification.

My invention relates to improvements in the valve mechanism or controlling devices adapted to regulate or control the flow of air through the pneumatic or bellows customarily employed in automatic musical instruments, such as player pianos.

In carrying out my invention in conjunction with striker pneumatics I provide a pneumatic or bellows normally open to atmosphere, a valve to coact with a seat to shut off atmosphere from said pneumatic, an exhaust or suction chest having an apertured seat to coact with said valve when the latter is off the first named seat, and means controlled by the traveling music sheet, when passing over the tracker, to operate said valve, whereby when the valve is raised from the perforated seat it will shut off atmosphere from the pneumatic and provide communication through said perforated seat between said chest and pneumatic to cause the latter to collapse by exhaust therefrom through the perforated seat into the exhaust chest, and whereby when said valve is next located upon said perforated seat it will shut off suction from the pneumatic and open the latter to atmosphere. By this means I am enabled to provide a valve mechanism for the purpose stated, wherein the normal atmospheric pressure, due to the partial vacuum in the suction chest, may be greatly reduced upon the valve, thereby requiring less valve actuating effort, resulting in less exertion in pumping than ordinarily required with customary puppet valves used to control the operation of the pneumatics.

My invention further comprises novel details of improvement and combinations of parts that will be more fully hereinafter set forth and then pointed out in the claims.

Reference is to be had to the accompanying drawings forming part hereof, wherein, Figure 1 is a cross sectional view of a portion of an automatic player mechanism embodying my invention; Fig. 2 is a sectional face view of one of the valve seats shown in Fig. 1; Fig. 3 is a section on the line 3, 3, in Fig. 2; Fig. 4 is a plan view illustrating the flexible support for the valve; Fig. 5 is a plan view of the chest valve seat; Fig. 6 is a view similar to Fig. 1, illustrating modified means for controlling the valve; Fig. 7 is a view similar to Fig. 1, illustrating further modified means for controlling the valve and modified valve and valve seats; Fig. 8 is a detail view of a modified valve seat 5; Fig. 9 is a detail view of the means for actuating the valve of Fig. 7; Fig. 10 is a plan view of seat 9 of Fig. 7; Fig. 11 is a detail of the lower valve seat of Fig. 7 modified; Fig. 12 is a view similar to Fig. 7 including the passages 2; Fig. 13 is a plan view on the line 13, 13, in Fig. 12; Fig. 14 is a sectional view illustrating a further modification of valve seat 5, and showing the pneumatic in a different position from that shown in the preceding views; Fig. 15 is a sectional view illustrating a modification hereinafter explained; Fig. 16 is a view similar to Fig. 1 in the operated position; Fig. 17 is a section on the line 17, 17, in Fig. 16; Fig. 18 illustrates my improvements applied in a power or pumping bellows, and Fig. 19 is a plan view of the valve of Fig. 18.

Similar numerals of reference indicate corresponding parts in the several views.

In the drawings the numeral 1 indicates a power pneumatic or bellows of any suitable or wellknown construction, communicating with one or more ports or passages 2 in communication with a valve recess 3 having normal communication with atmosphere as through a port or passage 4. In Figs. 1, 2, 3, 6, 8, 12 and 16 I have shown the port or passage 4 as provided in a plug or casing 5 that is seated in a bore in the board 1ª of the pneumatic that covers recess 3, which plug has a chamber 5ª communicating with port 4, concentric inner and outer seats 5$^b$, 5$^c$ being provided adjacent to said chamber. In the form shown in Figs. 1, 6 and 16 the ports or passages 2 are shown as holes formed in the board 1$^a$ outside of plug 5. In Figs. 7 and 12 the passage 2 is formed centrally in the plug 5, Fig. 12 also showing the holes 2 in board 1$^a$. In Figs. 14 and 15 the passage 4 is provided in the form of a hole in the board 3$^a$ and receives a plug 5$^d$ carried on a bridge 5 secured on said board providing seats 5$^b$, 5$^c$, said bridge providing spaces at its sides for communication of recess 3 with atmosphere. At 7 is a chest in which suction or exhaust is maintained by any suitable power bellows or the like 25 through pipe 8 in a well known manner. At 9 is a seat plug fitted in a hole in the board 10 between recess 3 and chest 7, and shown provided with inner and outer concentric seats 9$^a$, 9$^b$ inclosing passages 9$^c$ in said plug, whereby a perforated valve seat is provided for the control of air flowing from recess 3 to chest 7. At 11 is indicated, generally, a valve, to coact with the seats of plugs 5 and 9, as said valve plays between said seats. In Figs. 1, 7, 12, 14, 15 and 16 said valve is carried by a flexible support, shown in the form of a disk 12 having a plurality of flexible extensions or arms 12$^a$ (Figs. 4 and 13), shown secured at their ends to the boards of the chest, whereby said valve is free to play between the perforated seats, and air may flow around said valve between the arms 12$^a$ in Figs. 1, 6, 12, 14 and 16. Valve 11 is shown provided with an upper valve piece 11$^a$ and a lower valve piece 11$^b$ to coact respectively with the seats of plugs 5 and 9, and said valve may be provided with a stiffening disk 13 of metal. In Fig. 6 the valve 11, instead of being carried by the flexible arms 12$^a$, is secured to stem 14, shown guided in bores in plugs 5 and 9. In Figs. 1, 14 and 16 stem 14 is only guided in plug 9 and bears against valve 11 to push it toward seats 5$^b$, 5$^c$.

In Figs. 1, 6, 14 and 16 there is a seat 9$^e$ (Fig. 5) surrounding stem 14 against which valve 11 may fit, thereby enabling said stem to fit freely in its guiding bore and still prevent suction affecting the valve adjacent to the stem outwardly to the inner seat 9$^a$, thus reducing atmospheric pressure upon the valve in relation to the suction in chest 7 that otherwise would be effective through such bore. In other words, by having the seat 9$^e$ to coact with the valve, I cut off from the valve the influence of the suction that would be operative holding the valve to its seat in the absence of such seat 19$^e$.

In Figs. 7, 12 and 15, instead of using a central stem 14 I have shown a plurality of spaced arms 15 passing through holes in plug 9. As in Fig. 10, the arms 15 may pass through the large air openings in the valve plug, while in Fig. 11 spaced holes 15$^a$ may be provided for said arms. The lower ends of stem 14 and arms 15 rest upon a diaphragm 16 located at the recess 17 of chest 7 that communicates with port 18 of bore 19 of said chest board, which bore communicates by a tube 20 with a tracker orifice in a well known manner. The bleed 21 provides communication between chest 7 and bore 19.

In Figs. 1, 6, 14 and 16 valve 11 is imperforate, so as to close against seats 5$^b$, 5$^c$, and 9$^a$, 9$^b$, 9$^e$ respectively, allowing air to flow from the pneumatic to recess 3 through passages 2 without regard to said valve. In Fig. 7, however, where passage 2 is centrally disposed within plug 5, the valve 11 is shown centrally perforated at 11$^d$, so that when it is raised against seats 5$^b$, 5$^c$ to shut off recess 3 from atmosphere, a passageway is provided from the pneumatic through passage 2 and the valve opening 11$^d$ to recess 3. In Fig. 12 the passages 2 in the board 1$^a$ are provided, in addition to the perforated valve and plug 5 of Fig. 7, allowing a more free flow of air from or to the pneumatic. In Fig. 15 the valve 11 is also centrally perforated at 11$^d$ but the seat 9$^a$ surrounds the opening 22$^a$ of tube 22 that communicates with passage 2, the seat 9$^b$ surrounding and being concentric with opening 22$^a$, whereby when valve 11 closes upon seats 5$^b$, 5$^c$, the recess 3 and chest 7 will be in communication through the passages between seats 9$^a$ and 9$^b$, which will also be in communication with the pneumatic through 22$^a$, 22 and 2.

In accordance with my invention, when a note tracker orifice connected with tube 20 is closed by the traveling music sheet, the suction in chest 7, operating through the perforated plug 9, with assistance of bleed 21, causes valve 11 to rest upon the seats 9$^a$, 9$^b$, 9$^e$, shutting off communication through the passage or passages between said seats, thus closing communication between recess 3 and chest 7, whereupon the pneumatic will be expanded. When, however, a perforation in such note sheet opens communication through tube 20 to atmosphere, diaphragm 16 will be bulged causing valve 11 to be raised from seats 9$^a$, 9$^b$, 9$^e$ and close against seats 5$^b$, 5$^c$, opening communication between recess 3 and chest 7 through perforations in valve seat plug 9 and closing communication between recess 3 and atmosphere at seats 5$^b$, 5$^c$, whereupon suction in chest 7, drawing air from the pneumatic through passage or passages 2 and through the perforations in the valve seat plug 9, causes the pneumatic to collapse, such air from recess 3 flowing around and under the valve in Figs. 1 to 6, 12, 14, 15 and 16, and flowing through the valve from the pneumatic into recess 3, as in Figs. 7 and 12, or under the valve and directly from opening 22ª into the passages in valve seat 9, as in Fig. 15.

In Fig. 18 my improved perforated valve and valve seat are shown provided on the power or pumping bellows 25 that may be of any usual construction. In this case I have shown each board of the bellows provided with the perforated seat plug 9 having the concentric seats 9ª, 9ᵇ and the air spaces 9ᶜ that may be arranged in accordance with that shown in Fig. 8. The valve 11 is guided by a stem 26 secured centrally upon plug 9 and a spring 27 bearing against said valve and against the stud 28 on said stem normally retaining said valve upon its seat. The valves are so arranged as to provide suction within the chest 29, and when the board 25ª is pushed away from board 25ᵇ, as illustrated in Fig. 18, the valve 11 upon board 25ª will remain seated and the valve 11 upon board 25ᵇ will open, thereby drawing air from chest 29 into the bellows, and when the spring 30 collapses the bellows the valve upon the board 25ᵇ closes and valve 11 upon board 25ª opens, permitting the last named air to escape from the bellows. With my improvements applied upon such a power bellows the tension of the spring 30 may be reduced over that customarily employed with an ordinary flat valve, by reason of such atmospheric pressure being upon the valve 11, because the perforated valve 11, as shown in Fig. 19, may be used in this connection. This arrangement enables a relatively small movement of the valve to take place for a relatively large flow of air through the valve seat, and thereby enables a relatively small valve to be used.

From the foregoing, it will be seen that by means of my improvements I am enabled to utilize valves easily operative, and allowing much air to flow when raised but a relatively slight distance from their seats, while at the same time reducing the amount of air needed to operate such devices, since the relative area exposed to the suction in chest 7 may be reduced to an area corresponding to the lift of the valve to supply the required volume of air at any moment. This is advantageous in player piano mechanisms since it is a desideratum that the valves should have quick action with slight resistance thereby enabling lower tension and less volume of air to be utilized, whereby the effort of operating the power bellows is reduced.

While I have described my invention as applied in connection with suction or exhaust, it will, of course, be understood that the invention may be used in conjunction with air pressure, and it will also be understood that changes may be made in the details of construction and arrangements of parts shown and described, within the scope of the appended claims, without departing from the spirit of the invention.

Having now described my invention what I claim is:—

1. The combination of a valve, with a plurality of seats in position to coöperate with said valve and having one or more openings between said seats for the flow of air therethrough when the valve is off the seats, and spaced flexible arms connected with said valve, a stem to operate said valve whereby it may vibrate on said arms, a seat for said valve around said stem and within said first named seats, and a flexible diaphragm to control said stem.

2. The combination of a valve, with a plug having a chamber having an outlet and seats surrounding the outlet of said chamber to coact with said valve, with flexible arms spaced apart supporting said valve, said plug having a central bore, and a seat for said valve around said bore within the first named seat, a stem for said valve slidable in said bore, and a diaphragm to control said stem.

3. The combination of a valve having opposed members, concentric seats on one side of the valve having one or more openings therebetween, concentric seats on the opposite side of the valve having one or more openings therebetween, and flexible means between the opposed members and connected with said valve to permit it to move between said seats.

4. The combination of a valve, concentric seats on one side of the valve having one or more openings therebetween, concentric seats on the opposite side of the valve having one or more openings therebetween, and flexible means connected with said valve to permit it to move between said seats, said valve having an opening to communicate with one of the first named openings.

5. The combination of a valve, a plug on one side of said valve having concentric seats, said plug having one or more openings adjacent said seats, and a plug on the opposite side of said valve having seats, said plug having a chamber adjacent said seats and provided with an opening for the flow of air therethrough.

6. The combination of a valve, a plug on one side of said valve having concentric seats, said plug having one or more openings adjacent said seats, and a plug on the opposite side of said valve having seats, said plug having a chamber adjacent said seats and provided with an opening for the flow of air therethrough, said plug having a passage therethrough, said valve having an opening in position to connect with said passage.

7. The combination of a pneumatic having a board provided with a passage for communication with atmosphere, a plug carried by said board and having concentric seats and a chamber opening between said seats and having an opening for communication with atmosphere through said passage, a valve to coact with said seats, said pneumatic having a recess containing said seats and valve, and means for operating said valve.

Signed at New York city, in the county of New York and State of New York, this 30th day of April, A. D. 1913.

LOUIS H. MAIER.

Witnesses:
T. F. BOURNE,
MARIE F. WAINRIGHT.

Copies of this patent may be obtained for five cents each, by addressing the "Commissioner of Patents. Washington, D. C."